US010974333B2

(12) United States Patent
Hiraga

(10) Patent No.: US 10,974,333 B2
(45) Date of Patent: Apr. 13, 2021

(54) WIRE ELECTRICAL DISCHARGE MACHINE AND METHOD OF CONTROLLING WIRE ELECTRICAL DISCHARGE MACHINE

(71) Applicant: FANUC CORPORATION, Yamanashi (JP)

(72) Inventor: Kaoru Hiraga, Yamanashi-ken (JP)

(73) Assignee: FANUC CORPORATION, Yamanashi (JP)

( * ) Notice: Subject to any disclaimer, the term of this patent is extended or adjusted under 35 U.S.C. 154(b) by 135 days.

(21) Appl. No.: 16/259,193

(22) Filed: Jan. 28, 2019

(65) Prior Publication Data
US 2019/0232408 A1    Aug. 1, 2019

(30) Foreign Application Priority Data

Feb. 1, 2018  (JP) .............................. JP2018-016521

(51) Int. Cl.
*B23H 7/20* (2006.01)
*B23K 7/06* (2006.01)
(Continued)

(52) U.S. Cl.
CPC ............... *B23H 7/20* (2013.01); *B23H 1/024* (2013.01); *B23H 7/065* (2013.01); *B23H 7/105* (2013.01);
(Continued)

(58) Field of Classification Search
CPC . B23H 1/02; B23H 1/024; B23H 7/06; B23H 7/065; B23H 7/20; B23H 2500/20
See application file for complete search history.

(56) References Cited

U.S. PATENT DOCUMENTS 6,787,727 B2 *   9/2004   Yamada ................. B23H 7/102
                                                 219/69.12
2004/0238417 A1 * 12/2004  Arakawa ................. B23H 7/36
                                                 210/85
(Continued)

FOREIGN PATENT DOCUMENTS

CN     101890543 A    11/2010
CN     106424991 A     2/2017
(Continued)

OTHER PUBLICATIONS

Notice of Reasons for Refusal issued by the Japanese Patent Office in relation to Japanese Application No. 2018-016521 dated Dec. 24, 2019 (4 pages) along with English language translation (4 pages).

(Continued)

*Primary Examiner* — Erin E McGrath
(74) *Attorney, Agent, or Firm* — Robert P. Michal, Esq.; Carter, DeLuca & Farrell LLP

(57) ABSTRACT

A wire electrical discharge machine includes a wire feeding hole position acquisition unit configured to obtain a position of a wire feeding hole that allows for insertion and feeding of a wire electrode. In this wire electrical discharge machine, when the position of the wire feeding hole obtained by the wire feeding hole position acquisition unit is deviated from a wire feeding position defined by a machining program, a wire feeding control unit controls a machine main body to move the wire electrode to the position of the wire feeding hole and feed the wire electrode there, and a machining control unit controls the machine main body to perform electrical discharge machining on a workpiece with the wire electrode while moving the wire electrode on a path segment between a position where the wire electrode has been fed and the wire feeding position defined by the machining program.

6 Claims, 11 Drawing Sheets

(51) Int. Cl.
 B23H 7/10 (2006.01)
 B23H 1/02 (2006.01)
 B23H 7/06 (2006.01)
(52) U.S. Cl.
 CPC ............ *B23K 7/06* (2013.01); *B23H 2500/20* (2013.01); *G05B 2219/45043* (2013.01)

(56) References Cited

U.S. PATENT DOCUMENTS

| 2016/0243635 A1* | 8/2016 | Abe .................. B23H 1/02 |
| 2017/0087656 A1 | 3/2017 | Hasegawa |
| 2017/0173715 A1 | 6/2017 | Hiraga |
| 2017/0193654 A1 | 7/2017 | Hashimoto et al. |

FOREIGN PATENT DOCUMENTS

| JP | 56-119327 A | 9/1981 |
| JP | S64-040219 A | 2/1989 |
| JP | 01-135423 A | 5/1989 |
| JP | H02311221 A | 12/1990 |
| JP | 05-253749 A | 10/1993 |
| JP | H07204940 A | 8/1995 |
| JP | 2006-136964 A | 6/2006 |
| JP | 2006-277099 A | 10/2006 |
| JP | 2010-005735 A | 1/2010 |
| JP | 2012040708 A | 3/2012 |
| JP | 2013063445 A | 4/2013 |
| JP | 2016-155187 A | 9/2016 |
| JP | 2017-185559 A | 10/2017 |

OTHER PUBLICATIONS

Decision to Grant a Patent issued by the Japanese Patent Office in relation to Japanese Application No. 2018-016521 dated Mar. 17, 2020 (3 pages) along with English language translation (2 pages).

* cited by examiner

FIG. 3

MAIN PROGRAM

```
O200;
M60;          ···FEED WIRE ELECTRODE
M98P220;      ···CALL SUB-PROGRAM (MACHINING OF MACHINING SHAPE A)
M50;          ···CUT WIRE ELECTRODE
G00X15.0;     ···MOVE TO NEXT WIRE FEEDING POSITION

M60;          ···FEED WIRE ELECTRODE
M98P220;      ···CALL SUB-PROGRAM (MACHINING OF MACHINING SHAPE B)
M50;          ···CUT WIRE ELECTRODE
G00X15.0;     ···MOVE TO NEXT WIRE FEEDING POSITION

M60;          ···FEED WIRE ELECTRODE
M98P220;      ···CALL SUB-PROGRAM (MACHINING OF MACHINING SHAPE C)
M50;          ···CUT WIRE ELECTRODE
G00X15.0;     ···MOVE TO NEXT WIRE FEEDING POSITION

M60;          ···FEED WIRE ELECTRODE
M98P220;      ···CALL SUB-PROGRAM (MACHINING OF MACHINING SHAPE D)
M50;          ···CUT WIRE ELECTRODE
M30;
```

SUB-PROGRAM

```
O220;
G92X0.0T0.0;     ···SET COORDINATE SYSTEM
G91G01G42Y-4.0;  ⎤
X-5.0;           |
Y8.0;            |
X10.0;           ⎬ CUTTING FEED (ELECTRICAL DISCHARGE MACHINING)
Y-8.0;           |
X-5.0;           |
G40Y4.0;         ⎦
M99;
```

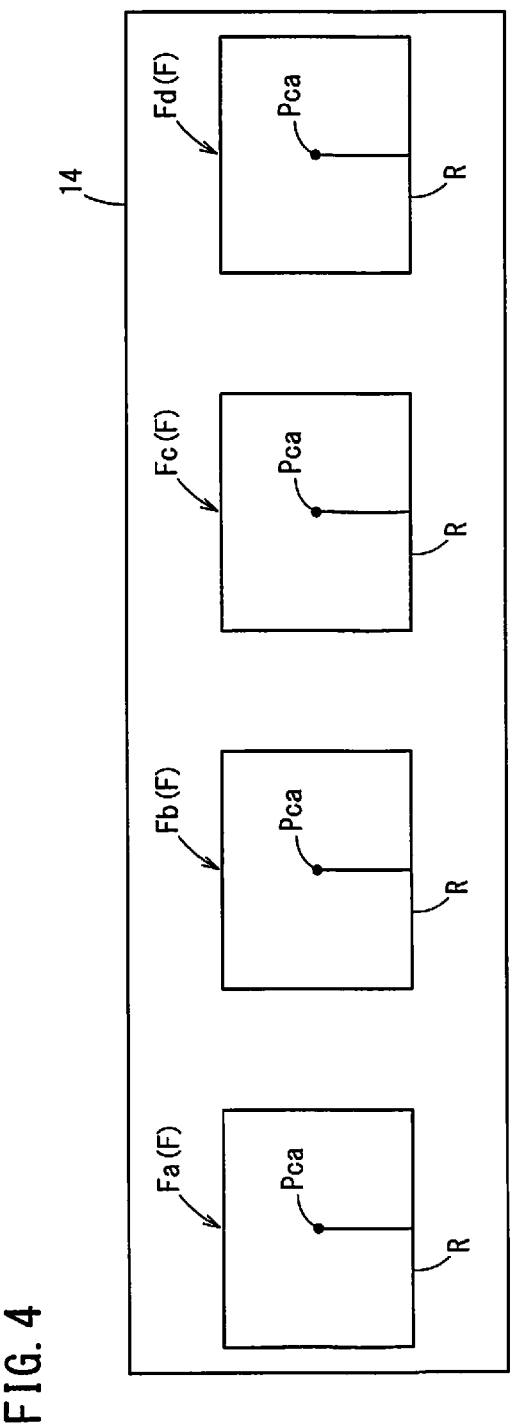

WIRE ELECTRICAL DISCHARGE MACHINE AND METHOD OF CONTROLLING WIRE ELECTRICAL DISCHARGE MACHINE

CROSS-REFERENCE TO RELATED APPLICATION

This application is based upon and claims the benefit of priority from Japanese Patent Application No. 2018-016521 filed on Feb. 1, 2018, the contents of which are incorporated herein by reference.

BACKGROUND OF THE INVENTION

Field of the Invention

The present invention relates to a wire electrical discharge machine that performs electrical discharge machining on a workpiece with a wire electrode according to a machining program, and also relates to a control method of the wire electrical discharge machine.

Description of the Related Art

Japanese Laid-Open Patent Publication No. 2016-155187 discloses a wire electrical discharge machine having a wire electrode feeding unit for feeding a wire electrode based on a wire electrode feeding command of a machining program. In this wire electrical discharge machine, when a wire feeding hole through which the wire electrode is fed is located at a position deviated from a wire electrode feeding position on a machining path so that the wire electrode feeding unit cannot complete wire feeding, the operator manually moves the wire electrode to the feeding hole position and then performs the wire feeding at the feeding hole position.

SUMMARY OF THE INVENTION

In the technique described in Japanese Laid-Open Patent Publication No. 2016-155187, when the wire feeding hole is located at a position deviated from the wire electrode feeding position on the machining path defined by the machining program, the operator needs to manually perform wire electrode feeding, which would increase the burden on the operator. Further, because it involves manual work, continuous automatic operation cannot be achieved, resulting in lowered productivity.

The present invention has been devised to solve the above problems, and it is therefore an object of the present invention to provide a wire electrical discharge machine which is capable of performing auto wire feeding for a wire electrode and machining a workpiece even when the position of a wire feeding hole formed on the workpiece is deviated from a wire feeding position defined by a machining program, and also provide a control method of such a wire electrical discharge machine.

According to a first aspect of the present invention, a wire electrical discharge machine having a machine main body for performing electrical discharge machining on a workpiece with a wire electrode in accordance with a machining program, includes: a wire feeding control unit configured to control the machine main body so as to move the wire electrode to a wire feeding position on the workpiece defined by the machining program and feed the wire electrode; a machining control unit configured to control the machine main body so as to perform electrical discharge machining on the workpiece with the wire electrode while moving the wire electrode along a machining path defined by the machining program; an imaging unit configured to take an image of the workpiece; and a wire feeding hole position acquisition unit configured to obtain a position of a wire feeding hole that allows for insertion and feeding of the wire electrode, from the image of the workpiece taken by the imaging unit. In this wire electrical discharge machine, when the position of the wire feeding hole obtained by the wire feeding hole position acquisition unit is deviated from the wire feeding position defined by the machining program, the wire feeding control unit is configured to control the machine main body to move the wire electrode to the position of the wire feeding hole and feed the wire electrode there, and the machining control unit is configured to control the machine main body to perform electrical discharge machining on the workpiece with the wire electrode while moving the wire electrode on a path segment between a position where the wire electrode has been fed and the wire feeding position defined by the machining program.

According to a second aspect of the present invention, a control method of a wire electrical discharge machine having a machine main body for performing electrical discharge machining on a workpiece with a wire electrode in accordance with a machining program includes: a wire feeding controlling step of controlling the machine main body so as to move the wire electrode to a wire feeding position on the workpiece defined by the machining program and feed the wire electrode; a machining controlling step of controlling the machine main body so as to perform electrical discharge machining on the workpiece with the wire electrode while moving the wire electrode along a machining path defined by the machining program; an imaging step of taking an image of the workpiece by an imaging unit; and a wire feeding hole position acquisition step of obtaining a position of a wire feeding hole that allows for insertion and feeding of the wire electrode, from the image of the workpiece taken at the imaging step. In this method, when the position of the wire feeding hole obtained at the wire feeding hole position acquisition step is deviated from the wire feeding position defined by the machining program, the wire feeding controlling step controls the machine main body to move the wire electrode to the position of the wire feeding hole and feed the wire electrode there; and the machining controlling step controls the machine main body to perform electrical discharge machining on the workpiece with the wire electrode while moving the wire electrode on a path segment between a position where the wire electrode has been fed and the wire feeding position defined by the machining program.

According to the present invention, even when the position of the wire feeding hole formed in the workpiece is deviated from the wire feeding position defined by the machining program, auto wire feeding of the wire electrode can performed, so that long continuous machining of the workpiece can be carried out.

The above and other objects, features, and advantages of the present invention will become more apparent from the following description when taken in conjunction with the accompanying drawings in which a preferred embodiment of the present invention is shown by way of illustrative example.

BRIEF DESCRIPTION OF THE DRAWINGS

FIG. 3 is a diagram showing an example of a machining program;

FIG. 4 is a diagram showing machining shapes in a workpiece, enclosed by machining paths defined by the machining program of FIG. 3;

DESCRIPTION OF THE PREFERRED EMBODIMENTS

First Embodiment

Figure 1:
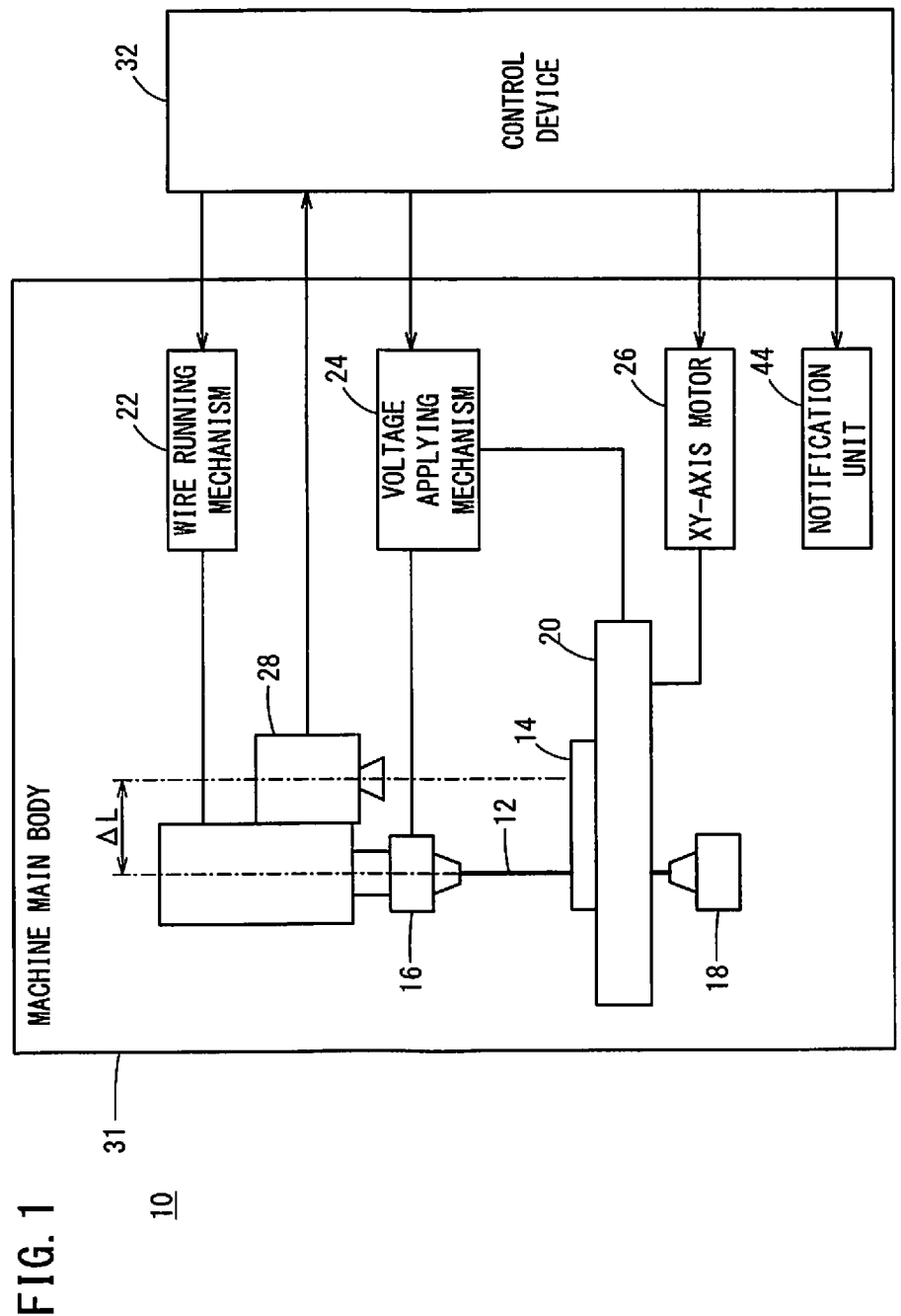
FIG. 1 is a schematic diagram showing a configuration of a wire electrical discharge machine.

[Configuration of Wire Electrical Discharge Machine] FIG. 1 is a schematic diagram showing a configuration of a wire electrical discharge machine 10. The wire electrical discharge machine 10 is a machine tool for performing electrical discharge machining on a workpiece 14 by generating electrical discharge between a wire electrode 12 and the workpiece 14 under application of voltage across the electrode gap therebetween. The wire electrical discharge machine 10 includes a machine main body 31 and a control device 32 for controlling the machine main body 31.

The machine main body 31 has an upper wire guide 16 and a lower wire guide 18 for guiding the wire electrode 12, a worktable 20 for fixing the workpiece 14 thereon, a wire running mechanism 22 for causing the wire electrode 12 to run or travel between the upper wire guide 16 and the lower wire guide 18 in a direction intersecting the workpiece 14, a voltage applying mechanism 24 for applying a voltage between the wire electrode 12 and the workpiece 14, XY-axis motors 26 for moving the worktable 20 on a horizontal plane, an imaging unit 28 for taking an image of the workpiece 14 from top and an notification unit 44 for giving notice to an operator.

The imaging unit 28 is fixed near the upper wire guide 16 and moves together with the upper wire guide 16 relative to the workpiece 14 as the worktable 20 moves. The position at which the optical axis of the imaging unit 28 intersects with the upper surface of the workpiece 14 and the position at which the wire electrode 12 intersects with the upper surface of the workpiece 14 are separated from each other by a predetermined offset ΔL (a predetermined distance) on the horizontal plane. The notification unit 44 is, for example, a speaker, a display device, signal lamps or the like, and notifies an operator of information by sound, image, lighting of lamps, or the like.

[Configuration of Control Device]

Figure 2:
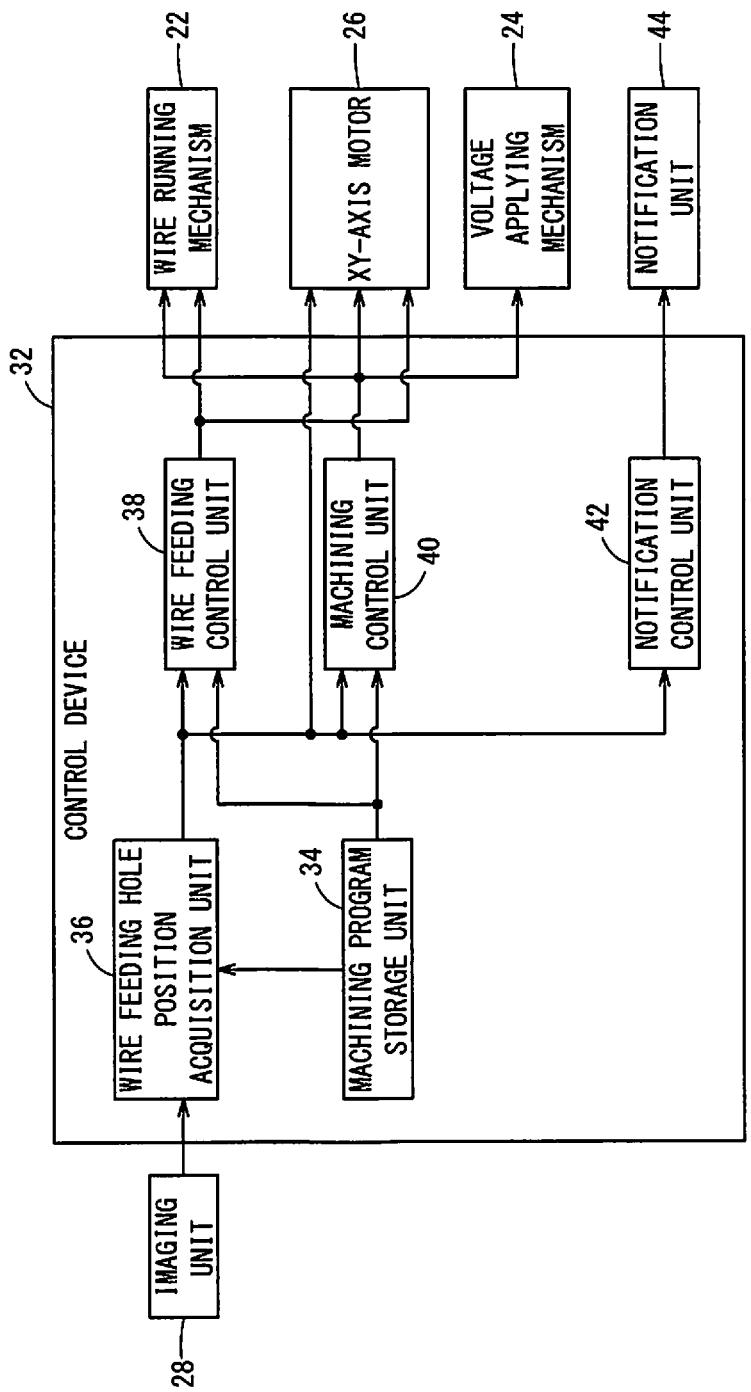
FIG. 2 is a control block diagram of a control device for controlling a machine main body.

FIG. 2 is a control block diagram of the control device 32 for controlling the machine main body 31. The control device 32 controls the machine main body 31 so as to automatically feed the wire electrode 12 to a wire feeding position on the workpiece 14 (hereinafter referred to as a prescribed wire feeding position Pca) defined by a machining program and performs electrical discharge machining on the workpiece 14 while moving the wire electrode 12 along a machining path defined by the machining program (hereinafter referred to as "machining path R").

The control device 32 includes a machining program storage unit 34, a wire feeding hole position acquisition unit 36, a wire feeding control unit 38, a machining control unit 40 and a notification control unit 42. The machining program storage unit 34 stores machining programs created in advance by CAD/CAM or the like.

The wire feeding hole position acquisition unit 36 receives an image of the workpiece 14 taken by the imaging unit 28 and the machining program stored in the machining program storage unit 34, which are input thereto. The wire feeding hole position acquisition unit 36 analyzes the input machining program to obtain the prescribed wire feeding position Pca, and controls the XY-axis motors 26 so as to position the imaging unit 28 above the prescribed wire feeding position Pca. At this time, the wire feeding hole position acquisition unit 36 controls the XY-axis motors 26 so that the position of intersection between the optical axis of the imaging unit 28 and the upper surface of the workpiece 14 coincides with the prescribed wire feeding position Pca. The wire feeding hole position acquisition unit 36 controls the imaging unit 28 so as to take the image of the workpiece 14 from the top of the prescribed wire feeding position Pca and analyzes the image of the workpiece 14 taken by the imaging unit 28, to thereby obtain the position of a wire feeding hole 30 (this position will be hereinafter referred to as "a wire feeding hole position Ph). Since the offset (distance) ΔL between the position of intersection between the optical axis of the imaging unit 28 and the upper surface of the workpiece 14 and the position of intersection between the upper surface of the workpiece 14 and the wire electrode 12 is known in advance as mentioned above, the wire feeding hole position acquisition unit 36 can acquire the position of the imaging unit 28 on the horizontal plane relative to the workpiece 14. Thus, the wire feeding hole position acquisition unit 36 can determine the position of the wire feeding hole 30 (FIG. 5A) through which the wire electrode 12 is inserted at the time of wire electrode feeding, from the image taken by the imaging unit 28.

Though in the above description the wire feeding hole position acquisition unit 36 controls the XY-axis motors 26 so that the position of intersection between the optical axis of the imaging unit 28 and the upper surface of the workpiece 14 coincides with the prescribed wire feeding position Pca, the wire feeding hole position acquisition unit 36 may control the XY-axis motors 26 so that the position of intersection between the wire electrode 12 and the upper surface of the workpiece 14 coincides with the prescribed wire feeding position Pca. At this time, the wire electrode 12 is not actually fed (present) between the upper wire guide 16 and the lower wire guide 18. However, on the assumption that the wire electrode 12 extends vertically between the upper wire guide 16 and the lower wire guide 18, the XY-axis motors 26 may be controlled so that the position of intersection between the virtual wire electrode 12 and the upper surface of the workpiece 14 will coincide with the prescribed wire feeding position Pca.

The wire feeding control unit 38 controls the wire running mechanism 22 and the XY-axis motors 26 so as to feed the wire electrode 12 at the prescribed wire feeding position Pca, in accordance with the machining program stored in the machining program storage unit 34.

The machining control unit 40 controls the wire running mechanism 22, the XY-axis motors 26 and the voltage applying mechanism 24 so that the wire electrode 12 can perform electrical discharge machining on the workpiece 14 while moving the wire electrode 12 along the machining path R (FIG. 4) in accordance with the machining program stored in the machining program storage unit 34. The notification control unit 42 controls the notification unit 44 so as to give notice to the operator.

[Machining Program]

FIG. 3 is a diagram showing an example of a machining program. FIG. 4 is a diagram showing machining shapes F in the workpiece 14, enclosed by the machining paths R defined by the machining program of FIG. 3.

The machining program shown in FIG. 3 is a program for creating four machining shapes F (machining shape Fa, machining shape Fb, machining shape Fc, machining shape Fd) in the workpiece 14, as shown in FIG. 4. The machining program shown in FIG. 3 consists of a main program and sub-programs. The main program is configured to perform feeding of the wire electrode 12 at each of multiple prescribed wire feeding positions Pca and call the sub-program. The sub-program is prescribed so as to perform electrical discharge machining on the workpiece 14 with the wire electrode 12 while moving the wire electrode 12 along the machining path R. The start point and the end point of the machining path R coincide with the prescribed wire feeding position Pca. The main program is prescribed such that, after each sub-program is completed, the wire electrode 12 is cut at the prescribed wire feeding position Pca, and then is brought to the prescribed wire feeding position Pca of the next machining shape F.

[Outline of Control Processing of Wire Electrical Discharge Machine]

Figure 5A:
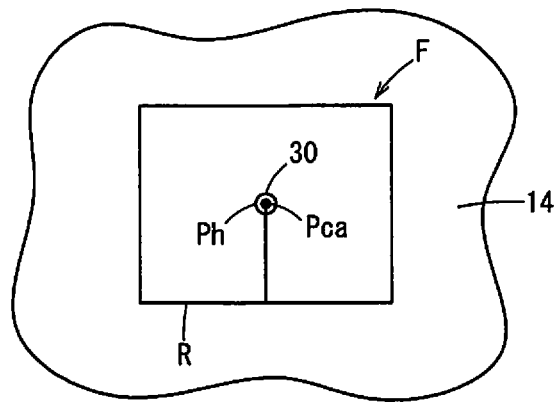
FIGS. 5A, 5B, and 5C are schematic diagrams each showing a workpiece with a wire feeding hole formed therein.
Figure 5B:
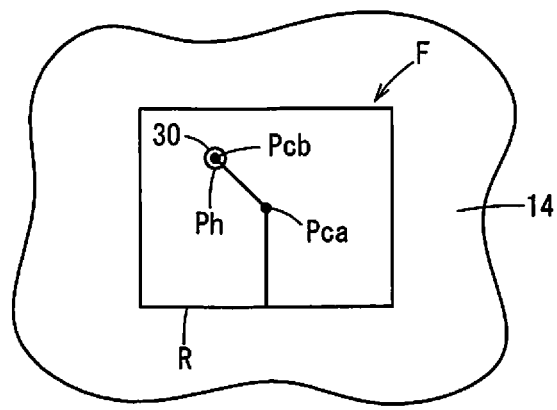
Figure 5C:
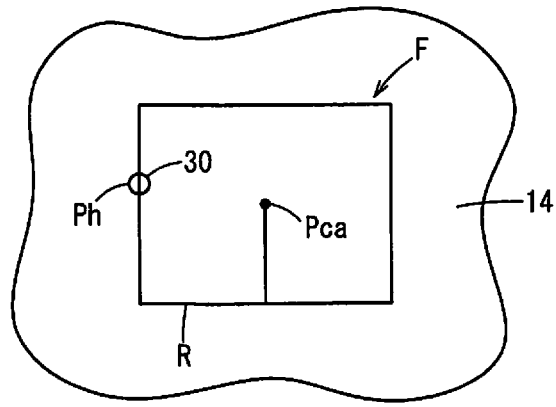

The outline of the control processing of the wire electrical discharge machine performed in the control device 32 of the present embodiment will be described. FIGS. 5A to 5C are schematic views showing the workpiece 14 with wire feeding holes 30 formed therein. As shown in FIGS. 5A to 5C, in the case of cutting off cores from the workpiece 14, wire feeding holes 30 for allowing the wire electrode 12 to be inserted at the time of wire feeding are formed in advance in the cores in the workpiece 14.

Normally, as shown in FIG. 5A, the wire feeding holes 30 are formed so that the position of the wire feeding hole 30 (hereinafter, referred to as wire feeding hole position Ph) coincides with the prescribed wire feeding position Pca. Here, the coincidence of the wire feeding hole position Ph with the prescribed wire feeding position Pca means that the prescribed wire feeding position Pca is contained within the circle of the wire feeding hole 30 when the workpiece 14 is viewed from above. The control device 32 controls the machine main body 31 so as to feed the wire electrode 12 at the prescribed wire feeding position Pca and then move the wire electrode 12 along the machining path R so that the wire electrode 12 performs electrical discharge machining on the workpiece 14.

As shown in FIG. 5B, there is a case in which the wire feeding hole 30 is formed so that the wire feeding hole position Ph of thereof deviates from the prescribed wire feeding position Pca. In this case, the control device 32 controls the machine main body 31 so that the wire electrode 12 is fed at the wire feeding hole position Ph. Herein, the wire feeding position of the wire electrode 12 on the workpiece 14 when the wire electrode 12 is fed is referred to as a wire feeding position Pcb. After completion of feeding of the wire electrode 12, the control device 32 controls the machine main body 31 so as to perform electrical discharge machining on the workpiece 14 by the wire electrode 12 while moving the wire electrode 12 on a path segment from the wire feeding position Pcb to the prescribed wire feeding position Pca. Thereafter, the control device 32 controls the machine main body 31 so as to perform electrical discharge machining on the workpiece 14 by the wire electrode 12 while moving the wire electrode 12 along the machining path R. Here, the wire electrode 12 is not necessarily required to be linearly moved on the path segment from the wire feeding position Pcb to the prescribed wire feeding position Pca, but the wire electrode 12 may be moved along any path as long as its traveling path does not interfere with the machining path R.

There is another case, as shown in FIG. 5C, in which the wire feeding hole 30 is formed so that at least part of the wire feeding hole 30 falls outside the machining shape F. In this case, since the machine main body 31 cannot machine the workpiece 14 into a desired machining shape F, the control device 32 stops machining the workpiece 14 and causes the notification unit 44 to notify the operator that machining of the workpiece 14 is unfeasible.

[Control Process of Wire Electrical Discharge Machine]

Figure 6:
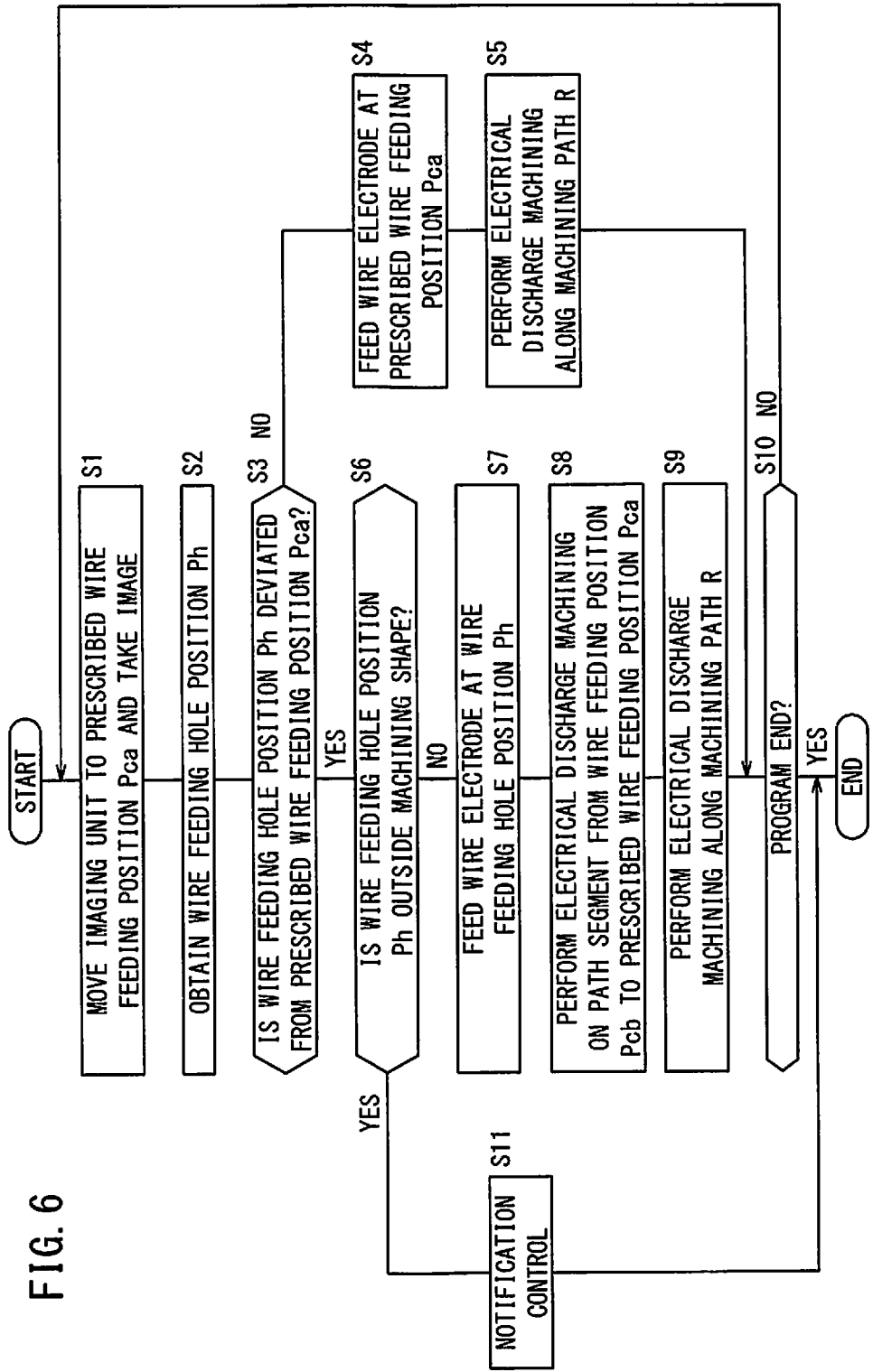
FIG. 6 is a flowchart showing a flow of processing control performed in the control device.

FIG. 6 is a flowchart showing a flow of processing performed in the control device 32. At step S1, the wire feeding hole position acquisition unit 36 controls the XY-axis motors 26 so as to move the imaging unit 28 to a position above the prescribed wire feeding position Pca. Then, the wire feeding hole position acquisition unit 36 causes the imaging unit 28 to take the image of the workpiece 14 from above the prescribed wire feeding position Pca. Then, the control proceeds to step S2. At step S2, the wire feeding hole position acquisition unit 36 analyzes the image taken by the imaging unit 28 to thereby obtain the wire feeding hole position Ph, and the control proceeds to step S3.

At step S3, the wire feeding hole position acquisition unit 36 compares the wire feeding hole position Ph acquired thereby with the prescribed wire feeding position Pca defined by the machining program stored in the machining program storage unit 34, and determines whether or not the wire feeding hole position Ph is deviated from the prescribed wire feeding position Pca. When the wire feeding hole position Ph is deviated from the prescribed wire feeding position Pca, the control proceeds to step S6. If the wire feeding hole position Ph is not deviated from the prescribed wire feeding position Pca, the control proceeds to step S4.

At step S4, the wire feeding control unit 38 controls the wire running mechanism 22 and the XY-axis motors 26 so as to move the wire electrode 12 to the prescribed wire feeding position Pca and feed the wire electrode 12. Then, the control proceeds to step S5.

At step S5, the machining control unit 40 controls the wire running mechanism 22, the XY-axis motors 26 and the voltage applying mechanism 24 so as to perform electrical discharge machining on the workpiece 14 with the wire electrode 12 while moving the wire electrode 12 along the machining path R. Then, the control proceeds to step S10.

At step S3 the wire feeding hole position Ph is determined to deviate from the prescribed wire feeding position Pca, and then at step S6 the wire feeding hole position acquisition unit 36 compares the wire feeding hole position Ph obtained thereby with the machining shape F enclosed by the machining path R defined by the machining program stored in the machining program storage unit 34 and determine whether or not the wire feeding hole position Ph falls outside the machining shape F. When the wire feeding hole position Ph lies outside of the machining shape F, the control proceeds to step S11. When the wire feeding hole position Ph is not outside of the machining shape F, the control proceeds to step S7.

At step S7, the wire feeding control unit 38 controls the wire running mechanism 22 and the XY-axis motors 26 so as to move the wire electrode 12 to the wire feeding hole position Ph and feed the wire electrode 12 at the wire feeding hole position Ph, then the control proceeds to step S8.

At step S8, the machining control unit 40 controls the wire running mechanism 22, the XY-axis motors 26 and the voltage applying mechanism 24 so as to perform electrical discharge machining on the workpiece 14 with the wire electrode 12 while moving the wire electrode 12 on a path segment from the wire feeding position Pcb to the prescribed wire feeding position Pca. Then, the control proceeds to step S9.

At step S9, the machining control unit 40 controls the wire running mechanism 22, the XY-axis motors 26 and the voltage applying mechanism 24 so as to perform electrical discharge machining on the workpiece 14 with the wire electrode 12 while moving the wire electrode 12 along the machining path R. Then, the control proceeds to step S10.

At step S10, the machining control unit 40 determines whether or not the machining program has ended. When the machining program has ended, that is, when the machining of the workpiece 14 is completed, the control is terminated. If the machining program has not yet ended, that is, if there is an unprocessed machining shape F, the control returns to step S1.

When the wire feeding hole position Ph is determined to fall outside of the machining shape F at step S6, the notification control unit 42 causes the notification unit 44 to notify the operator that the machining of the workpiece 14 is unfeasible, at step S11, and the control is terminated. After it is determined that the wire feeding hole position Ph lies outside of the machining shape F, neither the wire feeding control unit 38 nor the machining control unit 40 performs control on the machine main body 31.

[Operation and Effect]

Conventionally, there has been a wire electrical discharge machine 10 having an auto wire feeding function for automatically feeding the wire electrode 12. The wire electrical discharge machine 10 automatically feeds the wire electrode 12 at the prescribed wire feeding position Pca defined by the machining program. Normally, the wire feeding hole 30 is formed so that the wire feeding hole position Ph coincides with the prescribed wire feeding position Pca. However, cases occur where the wire feeding hole position Ph of the wire feeding hole 30 deviates from the prescribed wire feeding position Pca. In this case, conventionally, wire feeding for the wire electrode 12 cannot be automatically performed, and the operator has to manually operate the wire electrical discharge machine 10 so as to move the wire electrode 12 to the wire feeding hole position Ph and feed the wire electrode 12. Accordingly, this may increase the burden on the operator. Further, since the operator manually operates the wire electrical discharge machine 10, operation of the wire electrical discharge machine 10 has to be temporarily stopped, that is, continuous operation cannot be performed, resulting in reduced productivity.

To improve this situation, in the present embodiment, in a case where the wire feeding hole position Ph is deviated from the prescribed wire feeding position Pca, the wire feeding control unit 38 is configured to control the machine main body 31 of the wire electrical discharge machine 10 so as to move the wire electrode 12 to the wire feeding hole position Ph and feed the wire electrode 12 thereat. Then, the machining control unit 40 is configured to control the machine main body 31 so as to perform electrical discharge machining on the workpiece 14 with the wire electrode 12 while moving the wire electrode 12 on a path segment from the wire feeding position Pcb to the prescribed wire feeding position Pca.

With the above configuration, even when the wire feeding hole position Ph deviates from the prescribed wire feeding position Pca, the machine main body 31 can automatically feed the wire electrode 12. Further, after completion of feeding the wire electrode 12, the wire electrode 12 moves to the prescribed wire feeding position Pca, and then electrical discharge machining can be performed along the machining path R. Thus, the wire electrical discharge machine 10 can be operated continuously, so that productivity can be improved.

In the present embodiment, the imaging unit 28 is fixed so as to move relative to the workpiece 14 together with the upper wire guide 16 that guides the wire electrode 12. The wire feeding hole position acquisition unit 36 controls the machine main body 31 so as to move the imaging unit 28 to the prescribed wire feeding position Pca and obtain the wire feeding hole position Ph before feeding the wire electrode 12. Thereby, the imaging unit 28 can move together with the upper wire guide 16 relative to the workpiece 14. Since the offset (distance) ΔL on the horizontal plane between the position of intersection of the optical axis of the imaging unit 28 with the upper surface of the workpiece 14 and the position of intersection of the wire electrode 12 with the upper surface of the workpiece 14 is fixed, the wire feeding hole position acquisition unit 36 can obtain the wire feeding hole position Ph, with a high degree of accuracy, from the image taken by the imaging unit 28.

Further, in the present embodiment, in the case where at least part of the wire feeding hole 30 falls outside the machining shape F enclosed by the machining path R, the notification control unit 42 can cause the notification unit 44 to notify the operator that machining of the workpiece 14 cannot be performed. Thus, it is possible to prompt the operator to attach another workpiece 14 to the worktable 20, and hence the down-time of the wire electrical discharge machine 10 can be shortened, so that productivity can be improved.

Further, in the present embodiment, when the wire feeding hole position acquisition unit 36 determines that the wire feeding hole position Ph exists outside of the machining shape F, neither the wire feeding control unit 38 nor the machining control unit 40 performs control on the machine main body 31. Therefore, electrical discharge machining is not continued on the workpiece 14 that is unusable as a product, and thus it possible to suppress the processing time and the consumption of consumables such as the wire electrode 12 and others. As a result, productivity can be improved.

Second Embodiment

[Configuration of Control Device]

Figure 7:
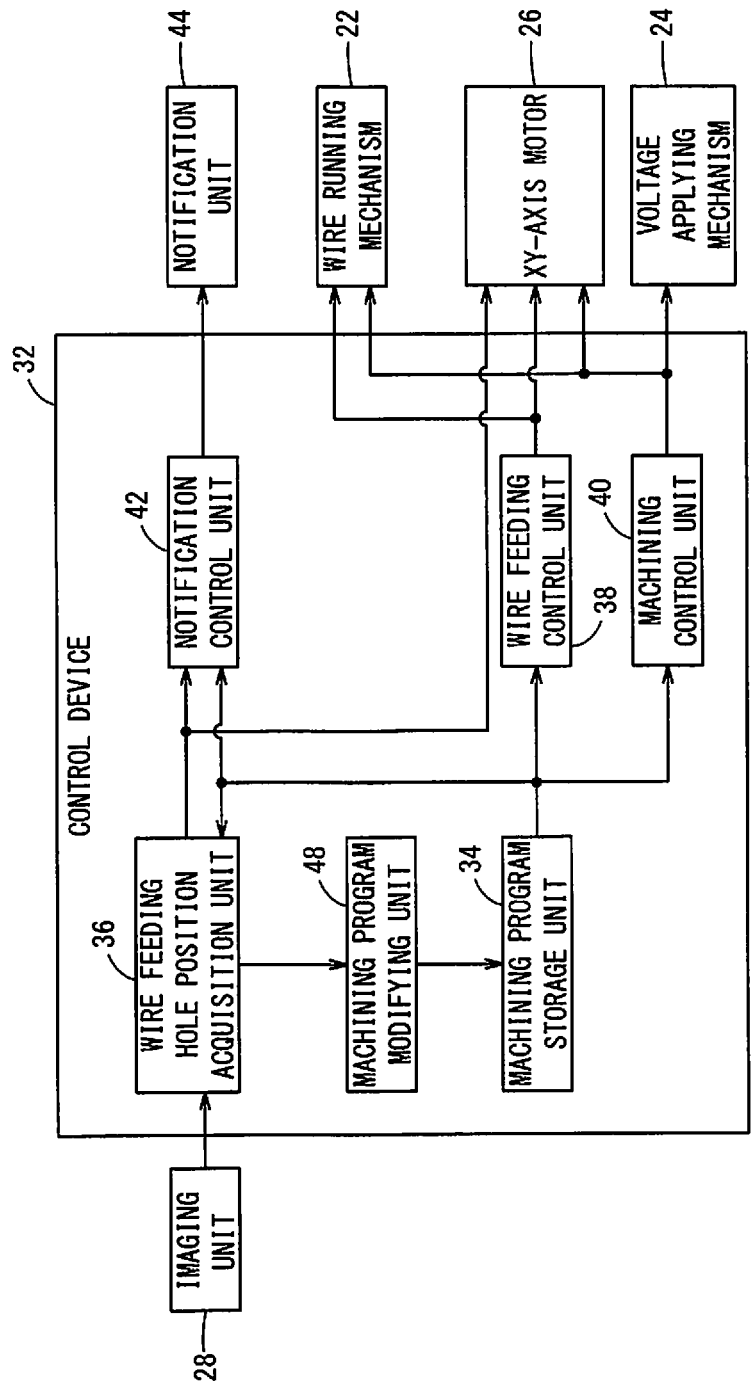
FIG. 7 is a control block diagram of a control device for controlling the machine main body.

FIG. 7 is a control block diagram of a control device 32 that controls a machine main body 31. In the control device 32 of the present embodiment, a machining program modifying unit 48 is added to the control device 32 of the first embodiment. In the present embodiment, when the wire feeding hole position Ph is deviated from the prescribed wire feeding position Pca, the machining program modifying unit 48 modifies the machining program. Specifically, the machining program modifying unit 48 modifies the machining program so that the wire feeding hole position Ph is set as a new prescribed wire feeding position Pca while a path segment between the new prescribed wire feeding position Pca and the old prescribed wire feeding position Pca, which is defined by the machining program before the modification, is added as a part of the machining path R to the machining path R defined by the machining program before the modification. When the machining program is modified by the machining program modifying unit 48, the machining program storage unit 34 stores the modified machining program.

When the machining program is modified by the machining program modifying unit 48, the wire feeding control unit 38 controls the wire running mechanism 22 and the XY-axis motors 26 in accordance with the modified machining program so that the wire electrode 12 is fed at the prescribed wire feeding position Pca after the modification.

When the machining program is modified by the machining program modifying unit 48, the machining control unit 40 controls the wire running mechanism 22, the XY-axis motors 26 and the voltage applying mechanism 24 in accordance with the modified machining program so as to perform electrical discharge machining on the workpiece 14 with the wire electrode 12 while moving the wire electrode 12 along the modified machining path R.

[Control Process of Wire Electrical Discharge Machine]

Figure 8:
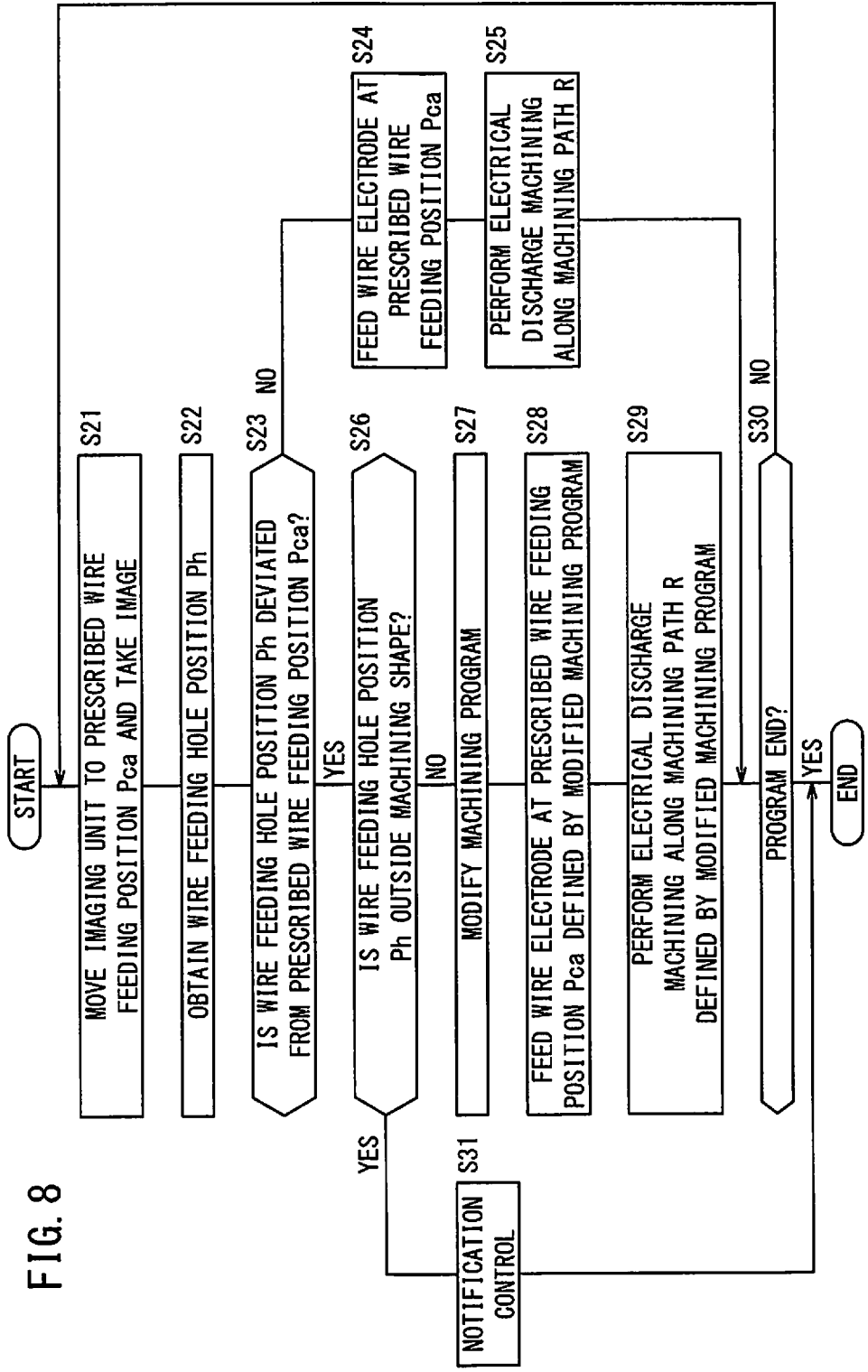
FIG. 8 is a flowchart showing a flow of processing control performed in the control device.

FIG. 8 is a flowchart showing a flow of processing performed in the control device 32. At step S21, the wire feeding hole position acquisition unit 36 controls the XY-axis motors 26 so as to move the imaging unit 28 to a position above the prescribed wire feeding position Pca. Then, the wire feeding hole position acquisition unit 36 controls the imaging unit 28 so as to take the image of the workpiece 14 from above the prescribed wire feeding position Pca. Then, the control proceeds to step S22. At step S22, the wire feeding hole position acquisition unit 36 analyzes the image taken by the imaging unit 28 to thereby obtain the wire feeding hole position Ph, and the control proceeds to step S23.

At step S23, the wire feeding hole position acquisition unit 36 compares the wire feeding hole position Ph obtained by itself with the prescribed wire feeding position Pca defined by the machining program stored in the machining program storage unit 34 to thereby determine whether or not the wire feeding hole position Ph is deviated from the prescribed wire feeding position Pca. When the wire feeding hole position Ph is deviated from the prescribed wire feeding position Pca, the control proceeds to step S26. When the wire feeding hole position Ph is not deviated from the prescribed wire feeding position Pca, the control proceeds to step S24.

At step S24, the wire feeding control unit 38 controls the wire running mechanism 22 and the XY-axis motors 26 so as to move the wire electrode 12 to the prescribed wire feeding position Pca and feed the wire electrode 12 there.

Then, the control proceeds to step S25.

At step S25, the machining control unit 40 controls the wire running mechanism 22, the XY-axis motors 26 and the voltage applying mechanism 24 so as to perform electrical discharge machining on the workpiece 14 with the wire electrode 12 while moving the wire electrode 12 along the machining path R. Then, the control proceeds to step S30.

The wire feeding hole position Ph is determined to be deviated from the prescribed wire feeding position Pca at step S23, and thereafter at step S26 the wire feeding hole position acquisition unit 36 compares the wire feeding hole position Ph obtained thereby with the machining shape F enclosed by the machining path R defined by the machining program stored in the machining program storage unit 34, and determines whether or not the wire feeding hole position Ph lies outside of the machining shape F. When the wire feeding hole position Ph falls outside of the machining shape F, the control proceeds to step S31. When the wire feeding hole position Ph is not outside of the machining shape F, the control proceeds to step S27.

At step S27, the machining program modifying unit 48 modifies the machining program stored in the machining program storage unit 34, and the control proceeds to step S28. At step S28, the wire feeding control unit 38 controls the wire running mechanism 22 and the XY-axis motors 26 so as to move the wire electrode 12 to the prescribed wire feeding position Pca defined by the modified machining program and feed the wire electrode 12 thereat. Then, the control proceeds to step S29.

At step S29, the machining control unit 40 controls the wire running mechanism 22, the XY-axis motors 26 and the voltage applying mechanism 24 so as to perform electrical discharge machining on the workpiece 14 with the wire electrode 12 while moving the wire electrode 12 along the machining path R defined by the modified machining program.

Then the control proceeds to step S30.

At step S30, the machining control unit 40 determines whether or not the machining program has ended. When the machining program has ended, that is, when machining of the workpiece 14 is completed, the process is terminated. When the machining program has not yet ended, that is, if there is an unprocessed machining shape F, the control returns to step S21.

The wire feeding hole position Ph is determined to fall outside the machining shape F at step S26, and thereafter at step S31, the notification control unit 42 causes the notification unit 44 to notify the operator that the machining of the workpiece 14 is unfeasible. Then the control is terminated. After it is determined that the wire feeding hole position Ph lies outside of the machining shape F, neither the wire feeding control unit 38 nor the machining control unit 40 performs control on the machine main body 31.

[Operation and Effect]

In the present embodiment, when the wire feeding hole position Ph is deviated from the prescribed wire feeding position Pca, the machining program modifying unit 48 modifies the machining program so as to set the wire feeding hole position Ph to be a new prescribed wire feeding position Pca and add a path segment between the new prescribed wire feeding position Pca and the old prescribed wire feeding position Pca defined by the pre-modification machining program as a part of the machining path R, to the machining path R defined by the pre-modification machining program.

Owing to the above, even if the wire feeding hole position Ph is deviated from the prescribed wire feeding position Pca, the machine main body 31 can automatically feed the wire electrode 12 at the wire feeding hole position Ph. The path segment between the new prescribed wire feeding position Pca and the old prescribed wire feeding position Pca defined by the machining program before the modification is added, as part of the machining path R, to the machining path R, whereby electrical discharge machining can be performed along the new machining path R. Therefore, since the wire electrical discharge machine 10 can be operated continuously, productivity can be improved.

Third Embodiment

Figure 9:
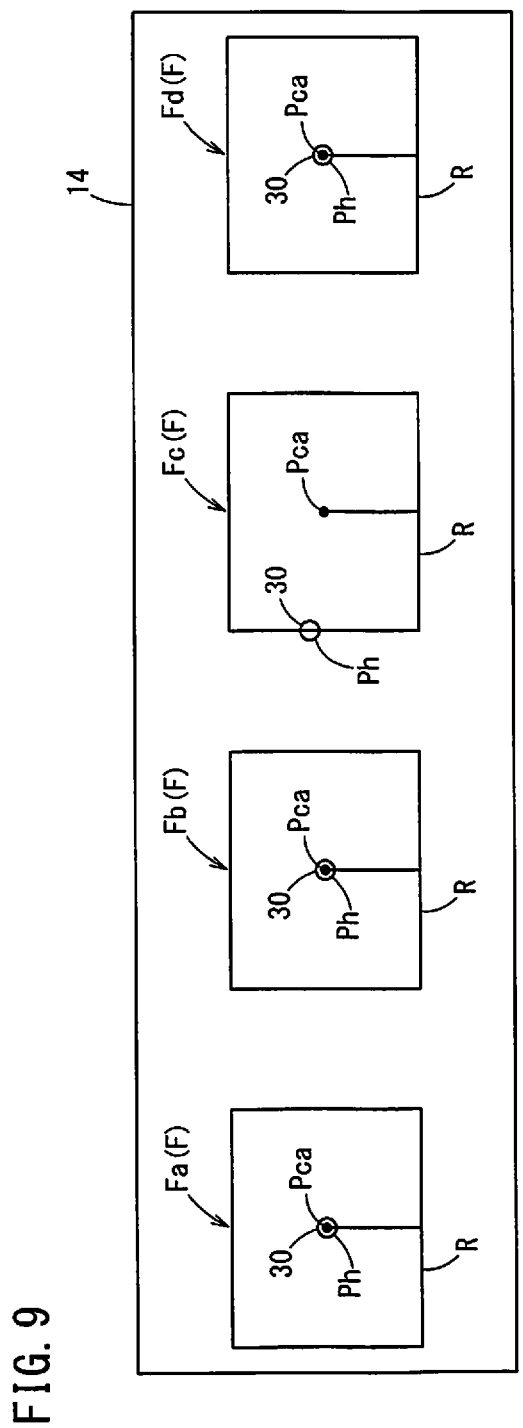
FIG. 9 is a diagram showing machining shapes in a workpiece, enclosed by machining paths defined by the machining program of FIG. 3 and wire feeding holes formed in the workpiece.

FIG. 9 is a diagram showing machining shapes F in a workpiece 14 enclosed by machining paths R defined by the machining program of FIG. 3 and wire feeding holes 30 formed in the workpiece 14. As shown in FIG. 9, part of the wire feeding holes 30 partially lies outside of the machining shape Fc. Under this circumstance, in a case where, before machining each of the machining shapes F, it is judged whether or not part of the wire feeding hole 30 falls outside of the machining shape F, if it turns out that machining of the machining shape Fc is unfeasible after machining of the machining shape Fa and the machining shape Fb has been completed, the workpiece 14 just has to be replaced. Therefore, the processing time of the machining shape Fa and the machining shape Fb, and the consumed consumables such as the consumed wire electrode 12, etc., go to waste.

In the present embodiment, before start of machining the workpiece 14, the imaging unit 28 is moved along the machining path R to capture images of the machining shapes F, and based on the images, the wire feeding hole position acquisition unit 36 obtains the wire feeding hole positions Ph in the machining shapes F. Accordingly, it is possible to determine whether or not there is any wire feeding hole 30 that falls outside the machining shape F before the machining of the workpiece 14 is started.

[Control Process of Wire Electrical Discharge Machine]

Figure 10:
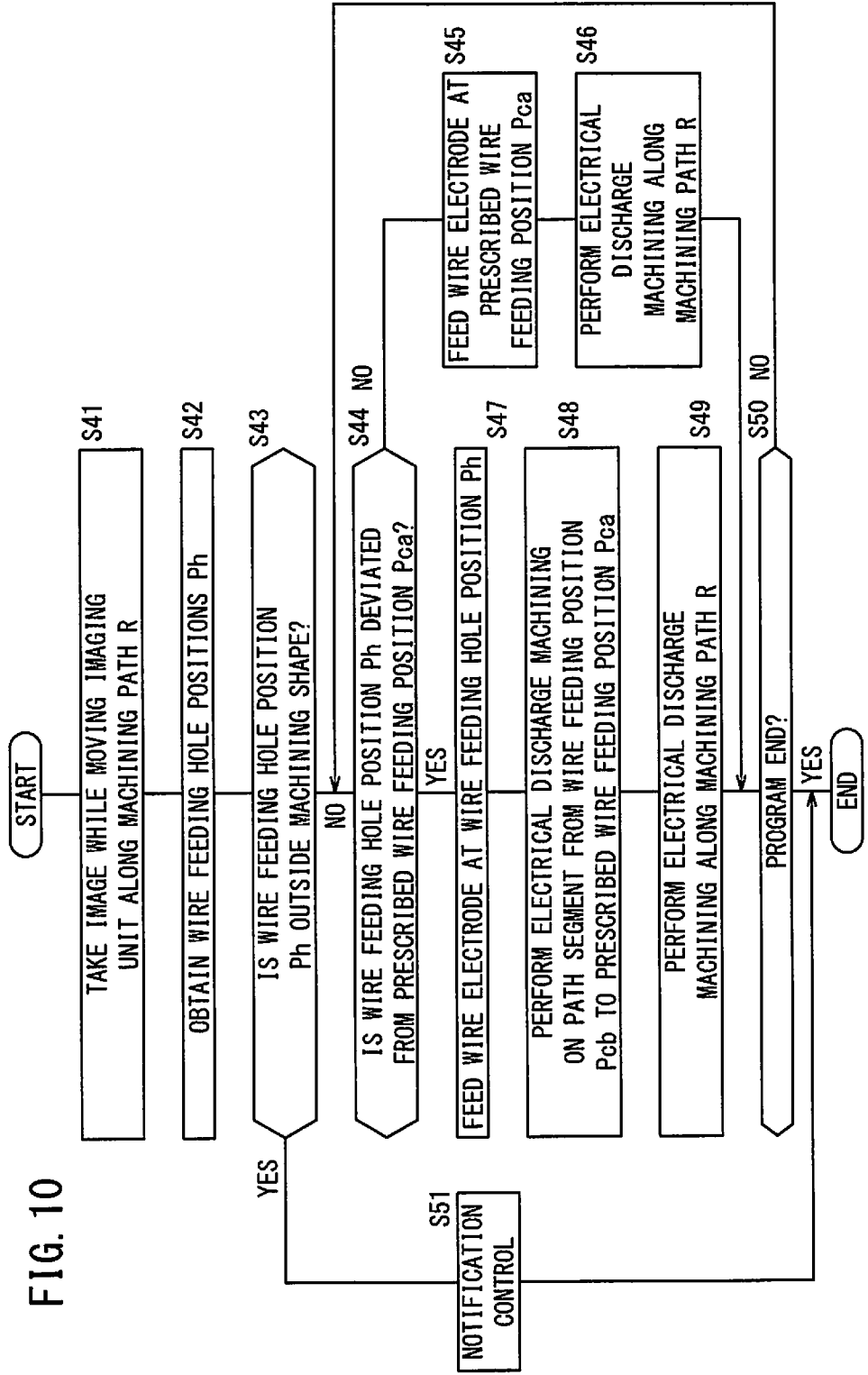
FIG. 10 is a flowchart showing a flow of processing control performed in the control device.

FIG. 10 is a flowchart showing a flow of processing performed in the control device 32. At step S41, the wire feeding hole position acquisition unit 36 controls the XY-axis motors 26 so as to move the imaging unit 28 along the machining path R and take an image of each machining shape F. Then, the control proceeds to step S42. At step S42, the wire feeding hole position acquisition unit 36 analyzes the images taken by the imaging unit 28 to thereby obtain the wire feeding hole position Ph in each machining shape F. Then, the control proceeds to step S43.

At step S43, the wire feeding hole position acquisition unit 36 compares all the wire feeding hole positions Ph obtained thereby respectively with all the machining shapes F enclosed by the machining paths R defined by the machining program stored in the machining program storage unit 34, and determines whether or not each of the wire feeding hole positions Ph falls out of the corresponding machining shape F. If there is any wire feeding hole position Ph that falls outside of the machining shape F, the control goes to step S51. If no wire feeding hole positions Ph fall outside the machining shapes F, the control goes to Step S44.

At step S44, the wire feeding hole position acquisition unit 36 compares, as to the machining shape F that is about to be machined, the wire feeding hole position Ph acquired thereby with the prescribed wire feeding position Pca defined by the machining program stored in the machining program storage unit 34, and determines whether or not the wire feeding hole position Ph is deviated from the prescribed wire feeding position Pca. When the wire feeding hole position Ph is deviated from the prescribed wire feeding position Pca, the control proceeds to step S47. If the wire feeding hole position Ph is not deviated from the prescribed wire feeding position Pca, the control proceeds to step S45.

At step S45, the wire feeding control unit 38 controls the wire running mechanism 22 and the XY-axis motors 26 so as to move the wire electrode 12 to the prescribed wire feeding position Pca and feed the wire electrode 12. Then, the control proceeds to step S46.

At step S46, the machining control unit 40 controls the wire running mechanism 22, the XY-axis motors 26 and the voltage applying mechanism 24 so as to perform electrical discharge machining on the workpiece 14 with the wire electrode 12 while moving the wire electrode 12 along the machining path R. Then, the control proceeds to step S50.

At step S47, the wire feeding control unit 38 controls the wire running mechanism 22 and the XY-axis motors 26 so as to move the wire electrode 12 to the wire feeding hole position Ph and feed the wire electrode 12. Then, the control proceeds to step S48.

At step S48, the machining control unit 40 controls the wire running mechanism 22, the XY-axis motors 26 and the voltage applying mechanism 24 so as to perform electrical discharge machining on the workpiece 14 with the wire electrode 12 while moving the wire electrode 12 on a path segment from the wire feeding position Pcb to the prescribed wire feeding position Pca. Then, the control proceeds to step S49.

At step S49, the machining control unit 40 controls the wire running mechanism 22, the XY-axis motors 26 and the voltage applying mechanism 24 so as to perform electrical discharge machining on the workpiece 14 with the wire electrode 12 while moving the wire electrode 12 along the machining path R. Then, the control proceeds to step S50.

At step S50, the machining control unit 40 determines whether or not the machining program has ended. When the machining program has ended, that is, when the machining of the workpiece 14 is completed, the control is terminated. If the machining program has not yet ended, that is, if there is an unprocessed machining shape F, the control returns to step S44.

It is determined that there is a wire feeding hole position Ph that falls outside of the machining shape F at step S43, and thereafter the notification control unit 42 causes the notification unit 44 to notify the operator that the machining of the workpiece 14 is unfeasible, at step S51. Then the control is terminated. After it is determined that there is a wire feeding hole position Ph that falls outside the machining shape F, the wire feeding control unit 38 and the machining control unit 40 stop control on the machine main body 31 and then no electrical discharge machining is performed on the workpiece 14.

[Operation and Effect]

In the present embodiment, the imaging unit 28 is fixed so as to move relative to the workpiece 14 together with the upper wire guide 16 that guides the wire electrode 12. The wire feeding hole position acquisition unit 36 is configured to control the machine main body 31 so as to move the imaging unit 28 relative to the workpiece 14 along the machining path R defined by the machining program before start of machining the workpiece 14 and obtain the wire feeding hole position Ph.

With the above configuration, the imaging unit 28 can move together with the upper wire guide 16 relative to the workpiece 14. Since the offset (distance) ΔL on the horizontal plane between the position of intersection of the optical axis of the imaging unit 28 with the upper surface of the workpiece 14 and the position of intersection of the wire electrode 12 with the upper surface of the workpiece 14 is fixed, the wire feeding hole position acquisition unit 36 can obtain the wire feeding hole position Ph, with a high degree of accuracy, from the image taken by the imaging unit 28. Further, before machining the workpiece 14, the wire feeding hole position Ph can be obtained.

Further, in the present embodiment, when at least part of the wire feeding holes 30 is located outside of the corresponding machining shape F enclosed by the machining path R defined by the machining program, the notification control unit 42 causes the notification unit 44 to notify the operator that the machining of the workpiece 14 cannot be done, before starting machining of the workpiece 14. Owing thereto, it is possible to prompt the operator to attach another workpiece 14 to the worktable 20 before starting the machining of the workpiece 14. It is therefore possible to suppress the machining time of the workpiece 14 and the consumption of consumables such as the wire electrode 12, thereby improving productivity.

Further, in the present embodiment, after the wire feeding hole position acquisition unit 36 determines that there is a wire feeding hole position Ph that falls outside of the machining shape F, neither the wire feeding control unit 38 nor the machining control unit 40 performs control on the machine main body 31. In this embodiment, since the wire feeding hole position Ph can be obtained before machining the workpiece 14, it is possible to determine whether or not the wire feeding hole position Ph is outside of the machining shape F before starting the machining of the workpiece 14. Therefore, no electrical discharge machining will be performed on the workpiece 14 that is unusable as a product, so it is possible to suppress the processing time and the consumption of consumables such as the wire electrode 12 etc., thereby improving productivity.

Fourth Embodiment

Also in the present embodiment, as in the third embodiment, before starting the machining of the workpiece 14, the imaging unit 28 is moved along the machining path R so as to take the image of each machining shape F, and based on the image, the wire feeding hole position acquisition unit 36 acquires the wire feeding hole position Ph of each machining shape F.

Further, in the present embodiment, similarly to the second embodiment, when the wire feeding hole position Ph is deviated from the prescribed wire feeding position Pca, the machining program is modified by the machining program modifying unit 48. Since the configuration of the control device 32 is the same as that of the second embodiment, its description is omitted.

[Control Process of Wire Electrical Discharge Machine]

Figure 11:
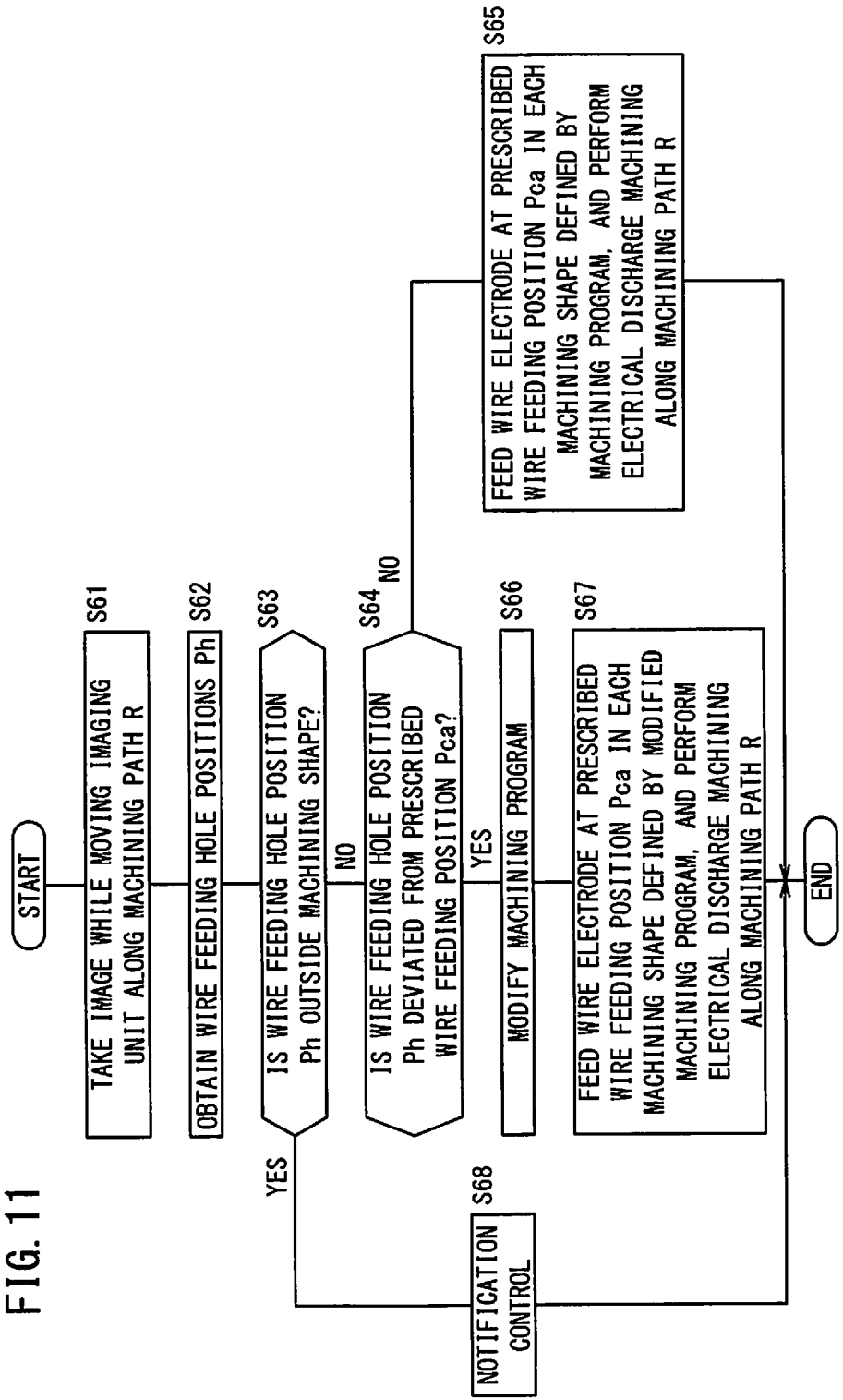
FIG. 11 is a flowchart showing a flow of processing control performed in the control device.

FIG. 11 is a flowchart showing a flow of processing performed in the control device 32. At step S61, the wire feeding hole position acquisition unit 36 controls the XY-axis motors 26 so as to move the imaging unit 28 along the machining path R and take the image of each machining shape F. Then, the control proceeds to step S62. At step S62, the wire feeding hole position acquisition unit 36 analyzes the images acquired by the imaging unit 28 to obtain the wire feeding hole position Ph of each machining shape F. Then, the control proceeds to step S63.

At step S63, the wire feeding hole position acquisition unit 36 compares all the wire feeding hole positions Ph taken thereby respectively with all the machining shapes F enclosed by machining paths R defined by the machining program stored in the machining program storage unit 34, and determines whether or not there is any wire feeding hole position Ph that falls out of the machining shape F. If there is any wire feeding hole position Ph that lies outside of the machining shape F, the control goes to Step S68. If no wire feeding hole position Ph falls outside the machining shape F, the control goes to Step S64.

At step S64, the wire feeding hole position acquisition unit 36 compares, as to the machining shape F that is about to be machined, the wire feeding hole position Ph acquired thereby with the prescribed wire feeding position Pca defined by the machining program stored in the machining program storage unit 34, and determines whether or not the wire feeding hole position Ph is deviated from the prescribed wire feeding position Pca. When the wire feeding hole position Ph is deviated from the prescribed wire feeding position Pca, the control proceeds to step S66. If the wire feeding hole position Ph is not deviated from the prescribed wire feeding position Pca, the control proceeds to step S65.

At step S65, the wire feeding control unit 38 controls the wire running mechanism 22 and the XY-axis motors 26 so as to move the wire electrode 12 to the prescribed wire feeding position Pca of each machining shape F in the machining program and feed the wire electrode 12. Then, the machining control unit 40 controls the wire running mechanism 22, the XY-axis motors 26 and the voltage applying mechanism 24 so as to perform electrical discharge machining on the workpiece 14 with the wire electrode 12 while moving the wire electrode 12 along the machining path R of each machining shape F, and then terminates the control.

At step S66, the machining program modifying unit 48 modifies the machining program stored in the machining program storage unit 34. Then, the control proceeds to step S67. At step S67, the wire feeding control unit 38 controls the wire running mechanism 22 and the XY-axis motors 26 so as to move the wire electrode 12 to the prescribed wire feeding position Pca of each machining shape F defined by the modified machining program and feed the wire electrode 12. Thereafter, the machining control unit 40 controls the wire running mechanism 22, the XY-axis motors 26, and the voltage applying mechanism 24 so as to perform electrical discharge machining on the workpiece 14 with the wire electrode 12 while moving the wire electrode 12 along the machining pat R in each machining shape F defined by the modified machining program. Then, the control is terminated.

It is determined that there is a wire feeding hole positions Ph that falls outside of the corresponding machining shape F at step S63, and thereafter the notification control unit 42 causes the notification unit 44 to notify the operator that the machining of the workpiece 14 is unfeasible, at step S68. Then the control is terminated. After it is determined that there is a wire feeding hole position Ph that falls outside the machining shape F, the wire feeding control unit 38 and the machining control unit 40 stop control on the machine main body 31 and then no electrical discharge machining is performed on the workpiece 14.

[Operation and Effect]

In the present embodiment, the imaging unit 28 is fixed so as to move relative to the workpiece 14 together with the upper wire guide 16 that guides the wire electrode 12. The wire feeding hole position acquisition unit 36 is configured to control the machine main body 31 so as to move the imaging unit 28 relative to the workpiece 14 along the machining path R defined by the machining program before start of machining the workpiece 14 and obtain the wire feeding hole position Ph.

With the above configuration, the imaging unit 28 can move together with the upper wire guide 16 relative to the workpiece 14. Since the offset ΔL on the horizontal plane between the position of intersection of the optical axis of the imaging unit 28 with the upper surface of the workpiece 14 and the position of intersection of the wire electrode 12 with the upper surface of the workpiece 14 is fixed, the wire feeding hole position acquisition unit 36 can obtain the wire feeding hole position Ph, with a high degree of accuracy, from the image taken by the imaging unit 28. Further, before machining the workpiece 14, the wire feeding hole position Ph can be obtained.

Further, in the present embodiment, when at least part of the wire feeding holes 30 is located outside of the corresponding machining shape F enclosed by the machining path R defined by the machining program, the notification control unit 42 causes the notification unit 44 to notify the operator that the machining of the workpiece 14 cannot be done, before starting machining of the workpiece 14. Owing thereto, it is possible to prompt the operator to attach another workpiece 14 to the worktable 20 before starting the machining of the workpiece 14. It is therefore possible to suppress the machining time of the workpiece 14 and the consumption of consumables such as the wire electrode 12.

Further, in the present embodiment, after the wire feeding hole position acquisition unit 36 determines that there is a wire feeding hole positions Ph that falls outside of the machining shape F, neither the wire feeding control unit 38 nor the machining control unit 40 performs control on the machine main body 31. In this embodiment, since the wire feeding hole position Ph can be obtained before machining the workpiece 14, it is possible to determine whether or not the wire feeding hole position Ph is outside of the machining shape F before starting the machining of the workpiece 14. Therefore, no electrical discharge machining will be performed on the workpiece 14 that is unusable as a product, so it is possible to suppress the processing time and the consumption of consumables such as the wire electrode 12 etc., thereby improving productivity.

[Technical Idea Obtained from Embodiment]

Technical ideas that can be grasped from the above embodiment will be described below.

A wire electrical discharge machine (10) having a machine main body (31) for performing electrical discharge machining on a workpiece (14) with a wire electrode (12) in accordance with a machining program, includes: a wire feeding control unit (38) configured to control the machine main body (31) so as to move the wire electrode (12) to a wire feeding position (Pca) on the workpiece (14) defined by the machining program and feed the wire electrode (12); a machining control unit (40) configured to control the machine main body (31) so as to perform electrical discharge machining on the workpiece (14) with the wire electrode (12) while moving the wire electrode (12) along a machining path (R) defined by the machining program; an imaging unit (28) configured to take an image of the workpiece (14); and a wire feeding hole position acquisition unit (36) configured to obtain a position (Ph) of a wire feeding hole (30) that allows for insertion and feeding of the wire electrode (12), from the image of the workpiece (14) taken by the imaging unit (28), wherein: when the position (Ph) of the wire feeding hole (30) obtained by the wire feeding hole position acquisition unit (36) is deviated from the wire feeding position (Pca) defined by the machining program, the wire feeding control unit (38) is configured to control the machine main body (31) to move the wire electrode (12) to the position (Ph) of the wire feeding hole (30) and feed the wire electrode (12) there; and the machining control unit (40) is configured to control the machine main body (31) to perform electrical discharge machining on the workpiece (14) with the wire electrode (12) while moving the wire electrode (12) on a path segment between a position (Pcb) where the wire electrode (12) has been fed and the wire feeding position (Pca) defined by the machining program. As a result, even when the position (Ph) of the wire feeding hole (30) is deviated from the wire feeding position (Pca) on the workpiece (14) defined by the machining program, the wire electrical discharge machine (10) can automatically feed the wire electrode (12), and thus machining can be continued, so that productivity can be improved.

The wire electrical discharge machine (10) may further include a machining program modifying unit (48) configured to, when the position (Ph) of the wire feeding hole (30) obtained by the wire feeding hole position acquisition unit (36) is deviated from the wire feeding position (Pca) defined by the machining program, modify the machining program so as to set the position (Ph) of the wire feeding hole (30) obtained by the wire feeding hole position acquisition unit (36) as a new wire feeding position (Pca) on the workpiece (14) and also so as to add a path segment between the new wire feeding position (Pca) defined by the modified machining program and the wire feeding position (Pca) defined by the machining program before the modification as part of the machining path (R), to the machining path (R) defined by the machining program before the modification. Thus, even when the position (Ph) of the wire feeding hole (30) is deviated from the wire feeding position (Pca) on the workpiece (14) defined by the machining program, the wire electrical discharge machine (10) can automatically feed the wire electrode (12), and thus machining can be continued, so that productivity can be improved.

The wire electrical discharge machine (10) may be configured such that: the imaging unit (28) is fixed so as to move relative to the workpiece (14), together with a wire guide (16) configured to guide the wire electrode (12); and the wire feeding hole position acquisition unit (36) is configured to, before feeding the wire electrode (12), control the machine main body (31) to move the imaging unit (28) to a position above the wire feeding position (Pca) on the workpiece (14) defined by the machining program, and obtain the position (Ph) of the wire feeding hole (30). With this configuration, the wire feeding hole position acquisition unit (36) can highly accurately determine the position (Ph) of the wire feeding hole (30) from the image taken by the imaging unit (28).

The wire electrical discharge machine (10) may be configured such that: the imaging unit (28) is fixed so as to move relative to the workpiece (14), together with a wire guide (16) configured to guide the wire electrode (12); and in a case where there are multiple wire feeding positions (Pca) defined by the machining program, the wire feeding hole position acquisition unit (36) is configured to, before start of machining the workpiece (14), control the machine main body (31) to move the imaging unit (28) relative to the workpiece (14) along the machining path (R) defined by the machining program and obtain the position (Ph) of each wire feeding hole (30). With this configuration, the wire feeding hole position acquisition unit (36) can determine the position (Ph) of the wire feeding hole (30) with high accuracy from the image taken by the imaging unit (28). Further, it is possible to obtain the wire feeding hole positions (Ph) before machining the workpiece (14).

The wire electrical discharge machine (10) may further include a notification unit (44) configured to, when at least part of the wire feeding hole (30) is located outside of the machining shape (F) enclosed by the machining path (R) defined by the machining program, give notice that machining of the workpiece (14) is unfeasible. This makes it possible to prompt the operator to attach another workpiece (14) to the worktable (20), and hence the down time of the wire electrical discharge machine (10) can be shortened, so that productivity can be improved.

The wire electrical discharge machine (10) may further include a notification unit (44) configured to, when at least part of the wire feeding holes (30) is located outside of the machining shape (F) enclosed by the machining path (R) defined by the machining program, give notice that the machining of the workpiece (14) is unfeasible, before start of machining the workpiece (14). This makes it possible to prompt the operator to attach another workpiece (14) to the worktable (20) before start of machining the workpiece (14). Therefore, it is possible to suppress the machining time of the workpiece (14) and suppress consumption of consumables such as the wire electrode (12).

The wire electrical discharge machine (10) may be configured such that, after at least part of the wire feeding hole (30) is determined to be located outside of the machining shape (F) enclosed by the machining path (R) defined by the machining program, neither the wire feeding control unit (38) nor the machining control unit (40) controls the machine main body (31). Owing to the above configuration, it is possible to avoid a situation that electrical discharge machining is continued on the workpiece (14) that is unusable as a product. Thus, it is possible to suppress the machining time and the consumption of consumables such as the wire electrode (12) etc., thereby improving productivity.

A control method of a wire electrical discharge machine (10) having a machine main body (31) for performing electrical discharge machining on a workpiece (14) with a wire electrode (12) in accordance with a machining program includes: a wire feeding controlling step of controlling the machine main body (31) so as to move the wire electrode (12) to a wire feeding position (Pca) on the workpiece (14) defined by the machining program and feed the wire electrode (12); a machining controlling step of controlling the machine main body (31) so as to perform electrical discharge machining on the workpiece (14) with the wire electrode (12) while moving the wire electrode (12) along a machining path (R) defined by the machining program; an imaging step of taking an image of the workpiece (14) by an imaging unit (28); and a wire feeding hole position acquisition step of obtaining a position (Ph) of a wire feeding hole (30) that allows for insertion and feeding of the wire electrode (12), from the image of the workpiece (14) taken at the imaging step. When the position (Ph) of the wire feeding hole (30) obtained at the wire feeding hole position acquisition step is deviated from the wire feeding position (Pca) defined by the machining program, the wire feeding controlling step controls the machine main body (31) to move the wire electrode (12) to the position (Ph) of the wire feeding hole (30) and feed the wire electrode (12) there; and the machining controlling step controls the machine main body (31) to perform electrical discharge machining on the workpiece (14) with the wire electrode (12) while moving the wire electrode (12) on a path segment between a position (Pcb) where the wire electrode (12) has been fed and the wire feeding position (Pca) defined by the machining program. As a result, even when the position (Ph) of the wire feeding hole (30) is deviated from the wire feeding position (Pca) on the workpiece (14) defined by the machining program, the wire electrical discharge machine (10) can automatically feed the wire electrode (12), and thus machining can be continued, so that productivity can be improved.

The control method of the wire electrical discharge machine (10) may further include a machining program modifying step of, when the position (Ph) of the wire feeding hole (30) obtained at the wire feeding hole position acquisition step is deviated from the wire feeding position (Pca) defined by the machining program, modifying the machining program so as to set the position (Ph) of the wire feeding hole (30) obtained at the wire feeding hole position acquisition step, as a new wire feeding position (Pca) on the workpiece (14) and also so as to add a path segment between the new wire feeding position (Pca) defined by the modified machining program and the wire feeding position (Pca) defined by the machining program before the modification as part of the machining path (R) to the machining path (R) defined by the machining program before the modification. Thus, even when the position (Ph) of the wire feeding hole (30) is deviated from the wire feeding position (Pca) on the workpiece (14) defined by the machining program, the wire electrical discharge machine (10) can automatically feed the wire electrode (12), and thus machining can be continued, so that productivity can be improved.

The method of controlling the wire electrical discharge machine (10) may be performed such that: the imaging unit (28) is fixed so as to move relative to the workpiece (14), together with a wire guide (16) configured to guide the wire electrode (12); and before feeding the wire electrode (12), the wire feeding hole position acquisition step controls the machine main body (31) to move the imaging unit (28) to a position above the wire feeding position (Pca) on the workpiece (14) defined by the machining program and obtains the position (Ph) of the wire feeding hole (30). Owing to the above, the wire feeding hole position acquisition unit (36) can highly accurately determine the position (Ph) of the wire feeding hole (30) from the image taken by the imaging unit (28).

The method of controlling the wire electrical discharge machine (10) may be performed such that: the imaging unit (28) is fixed so as to move relative to the workpiece (14), together with a wire guide (16) configured to guide the wire electrode (12); and in a case where there are multiple wire feeding positions (Pca) defined by the machining program, before start of machining the workpiece (14), the wire feeding hole position acquisition step controls the machine main body (31) to move the imaging unit (28) relative to the workpiece (14) along the machining path (R) defined by the machining program and obtains the position (Ph) of each wire feeding hole (30). Owing to the above, it is possible to determine whether or not the workpiece (14) currently set on the worktable (20) is unusable for a product before start of machining the workpiece (14), so productivity can be enhanced.

The method of controlling the wire electrical discharge machine (10) may further include a notification step of, when at least part of the wire feeding hole (30) is located outside of the machining shape (F) enclosed by the machining path (R) defined by the machining program, causing a notification unit (44) to give notice that the machining of the workpiece (14) is unfeasible. This makes it possible to prompt the operator to attach another workpiece (14) to the worktable (20), and hence the down time of the wire electrical discharge machine (10) can be shortened, so that productivity can be improved.

The method of controlling the wire electrical discharge machine (10) may further include a notification step of, when at least part of the wire feeding holes (30) is located outside of the machining shape (F) enclosed by the machining path (R) defined by the machining program, causing a notification unit (44) to give notice that the machining of the workpiece (14) is unfeasible, before start of machining the workpiece (14). This makes it possible to prompt the operator to attach another workpiece (14) to the worktable (20) before start of machining the workpiece (14). Therefore, it is possible to suppress the machining time of the workpiece (14) and suppress consumption of consumables such as the wire electrode (12).

The control method of the wire electrical discharge machine (10) may be performed such that after at least part of the wire feeding hole (30) is determined to be located outside of the machining shape (F) enclosed by the machining path (R) defined by the machining program, no control is performed on the machine main body (31) in the wire feeding controlling step or the machining controlling step. Owing to the above, it is possible to avoid a situation that electrical discharge machining is continued on the workpiece (14) that is unusable as a product. Thus, it is possible to suppress the machining time and the consumption of consumables such as the wire electrode (12) etc., thereby improving productivity.

The present invention is not particularly limited to the embodiments described above, and various modifications are possible without departing from the essence and gist of the present invention.

What is claimed is:

1. A wire electrical discharge machine comprising:
    a machine main body for performing electrical discharge machining on a workpiece with a wire electrode in accordance with a machining program;
    a camera configured to take an image of the workpiece and fixed so as to move relative to the workpiece; and
    a control device configured to:
        control the machine main body so as to move the wire electrode to a wire feeding position on the workpiece defined by the machining program and feed the wire electrode;
        control the machine main body so as to perform electrical discharge machining on the workpiece with the wire electrode while moving the wire electrode along a machining path defined by the machining program; and
        obtain a position of a wire feeding hole that allows for insertion and feeding of the wire electrode, from the image of the workpiece taken by the camera,
    wherein:
        when the position of the wire feeding hole is deviated from the wire feeding position defined by the machining program, the control device is configured to:
    control the machine main body to move the wire electrode to the position of the wire feeding hole and feed the wire electrode there, and
    control the machine main body to perform electrical discharge machining on the workpiece with the wire electrode while moving the wire electrode on a path segment between a position where the wire electrode has been fed and the wire feeding position defined by the machining program, and wherein the control device is further configured to, before start of machining the workpiece, control the machine main body to move the camera relative to the workpiece along the machining path defined by the machining program to obtain the position of the wire feeding hole.

2. The wire electrical discharge machine according to claim 1, wherein the control device is further configured to, when the position of the wire feeding hole is deviated from the wire feeding position defined by the machining program, modify the machining program so as to set the position of the wire feeding hole as a new wire feeding position on the workpiece and also so as to add a path segment between the new wire feeding position defined by the modified machining program and the wire feeding position defined by the machining program before the modification as part of the machining path, to the machining path defined by the machining program before the modification.

3. The wire electrical discharge machine according to claim 1, wherein:
    the camera is fixed so as to move relative to the workpiece, together with a wire guide configured to guide the wire electrode.

4. The wire electrical discharge machine according to claim 1, wherein the control device is further configured to, when at least part of the wire feeding hole is located outside of a machining shape enclosed by the machining path defined by the machining program, give notice that machining of the workpiece is unfeasible.

5. The wire electrical discharge machine according to claim 1, wherein the control device is further configured to, when at least part of the wire feeding hole is located outside of a machining shape enclosed by the machining path defined by the machining program, give notice that machining of the workpiece is unfeasible, before start of machining the workpiece.

6. The wire electrical discharge machine according to claim 1, wherein, after at least part of the wire feeding hole is determined to be located outside of a machining shape enclosed by the machining path defined by the machining program, the control device does not control the machine main body.

* * * * *